US009002538B2

(12) United States Patent
Hergesheimer et al.

(10) Patent No.: US 9,002,538 B2
(45) Date of Patent: *Apr. 7, 2015

(54) SYSTEMS AND METHODS FOR VIRTUAL IGNITION DETECTION

(71) Applicant: CalAmp Corporation, Oxnard, CA (US)

(72) Inventors: Peter D. Hergesheimer, Encinitas, CA (US); Stephen Hall, Carlsbad, CA (US); Joseph Brian Whiteside, Rancho Santa Margarita, CA (US)

(73) Assignee: CalAmp Corp., Oxnard, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/919,349

(22) Filed: Jun. 17, 2013

(65) Prior Publication Data
US 2013/0275001 A1   Oct. 17, 2013

Related U.S. Application Data

(63) Continuation of application No. 12/917,234, filed on Nov. 1, 2010, now Pat. No. 8,489,271.

(60) Provisional application No. 61/256,989, filed on Oct. 31, 2009, provisional application No. 61/257,137, filed on Nov. 2, 2009.

(51) Int. Cl.
*G06F 7/00* (2006.01)
*B60R 25/102* (2013.01)
*G07C 5/02* (2006.01)

(52) U.S. Cl.
CPC ............ *G06F 7/00* (2013.01); *B60R 25/102* (2013.01); *G07C 5/02* (2013.01)

(58) Field of Classification Search
USPC .................. 701/29.1, 31.4, 31.5, 1–2, 36
See application file for complete search history.

(56) References Cited

U.S. PATENT DOCUMENTS

| 5,825,283 | A | 10/1998 | Camhi |
| 8,489,271 | B2 * | 7/2013 | Hergesheimer et al. ..... 701/31.4 |
| 2003/0151507 | A1 | 8/2003 | Andre et al. |
| 2004/0075539 | A1 | 4/2004 | Savoie et al. |
| 2011/0106373 | A1 | 5/2011 | Hergesheimer et al. |

* cited by examiner

*Primary Examiner* — Yonel Beaulieu
(74) *Attorney, Agent, or Firm* — KPPB LLP

(57) ABSTRACT

Systems and methods for determining vehicle ignition state using a device added to the vehicle after the manufacture of the vehicle without a direct connection to the vehicle ignition line are disclosed. In a number of embodiments, a system includes a processor, a motion detector configured to detect vehicle motion and to enable the processor to obtain motion data, a Global Positioning System (GPS) receiver configured to determine location and to enable the processor to obtain at least speed data, and a radio transceiver configured to communicate with the processor. Additionally, the processor is configured to estimate the ignition state of a vehicle using at least the motion data and the speed data.

20 Claims, 4 Drawing Sheets

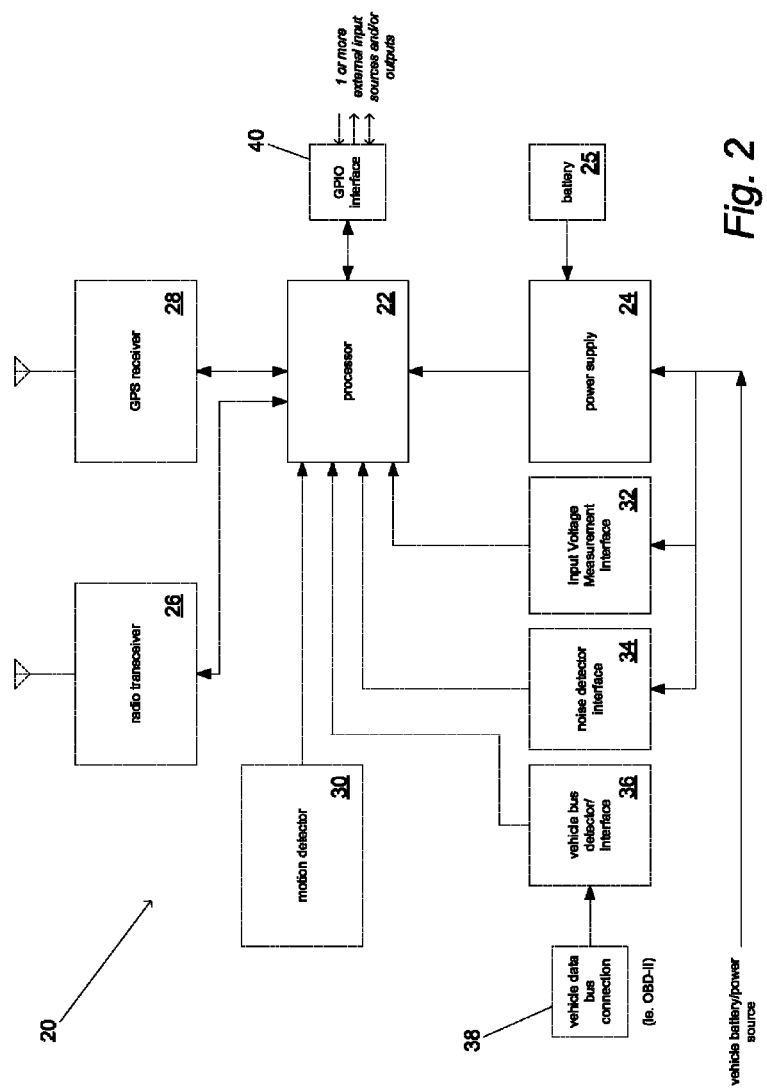

SYSTEMS AND METHODS FOR VIRTUAL IGNITION DETECTION

RELATED APPLICATIONS

This application is a continuation of U.S. application Ser. No. 12/917,234 filed Nov. 1, 2010, now U.S. Pat. No. 8,489,271. Application Ser. No. 12/917,234 claims priority to U.S. Provisional Application No. 61/256,989 filed Oct. 31, 3009 and U.S. Provisional Application No. 61/257,137 filed Nov. 2, 2009. The disclosures of U.S. patent application Ser. No. 12/917,234, U.S. Provisional Application No. 61/256,989, and U.S. Provisional Application No. 61/257,137 are hereby incorporated by reference in their entirety.

FIELD OF THE INVENTION

The present invention relates generally to vehicle telematics systems and more specifically to the detection of vehicle ignition by a vehicle telematics system.

BACKGROUND

A vehicle telematics system is typically a system installed in a vehicle that is capable of determining the location of the vehicle and communicating the vehicle's location to a remote location via a wireless communication link. Vehicle telematics systems are installed in a variety of applications including, but not limited to, fleet management, vehicle finance, vehicle maintenance, driver management, and/or fuel management.

A common configuration for a vehicle telematics system is illustrated in FIG. 1. The vehicle telematics system 10 includes a processor 12 that is configured to communicate with a radio transceiver 13 and a GPS receiver 14. The processor 12, the radio transceiver 13, and the GPS receiver 14 are typically powered by a power supply 15 that is connected via a line to the vehicle's battery. The vehicle telematics system can optionally include its own battery 16 to enable operation when the vehicle battery is removed and/or to prevent depletion of the vehicle battery. In many instances, the vehicle telematics system monitors the ignition line of the vehicle to determine the ignition state of the vehicle using an ignition input interface 17 that is connected to the vehicle ignition line. Monitoring the vehicle ignition state can be useful for reasons including, but not limited to, reporting vehicle ignition state and/or managing power consumption.

A common problem encountered during installation of devices in a motor vehicle that connect to the vehicle's electrical system is that the installer may inadvertently connect the ignition input interface 17 to a wire that is not the vehicle ignition line. U.S. Pat. No. 6,163,690, the disclosure of which is incorporated by reference herein in its entirety, notes the potential for the ignition sense line of a hands-free adapter for a mobile phone to be incorrectly connected to a line other than the ignition line due to installer error, which can result in the hands-free adaptor believing the ignition is always on and undesirably draining the vehicle's battery. U.S. Pat. No. 6,163,690 proposes a system that checks the correctness of the ignition sense line installation by monitoring the ignition sense line to determine whether the ignition line is switched off within a predetermined time period. In the event that the hands-free adaptor detects that the ignition line is always on, the hands-free adaptor provides an indication that it has been installed incorrectly.

SUMMARY OF THE INVENTION

Systems and methods are described for estimating the ignition state of a vehicle without connecting to the vehicle's ignition line. In a number of embodiments, vehicle telematics systems that do not include direct connections to the vehicle ignition line are configured to determine vehicle ignition state. In several embodiments, aspects of the power supply are monitored to determine the vehicle ignition state, including but not limited to, changes in the voltage on the power supply line, the noise level on the power supply line, and/or the AC coupling on the DC power supply line. In many embodiments, vehicle vibration indicative of ignition status is detected using an accelerometer. In a number of embodiments, rate of voltage transitions (i.e., message frequency) on the OBD or other data bus line is monitored to observe activity indicative of vehicle ignition. Voltage averaging may also be used to observe activity indicative of vehicle ignition. This may include voltage averaging on the OBD or other data bus line monitored to observe activity indicative of vehicle ignition. In many instances, techniques including those outlined above are used in combination with GPS data to determine vehicle ignition status. By eliminating the need to connect to a vehicle ignition line, systems and methods in accordance with embodiments of the invention simplify the installation process and reduce the likelihood that errors in the installation process will negatively impact the performance of the installed device.

In a number of embodiments, a system includes a processor, a motion detector configured to detect vehicle motion and to enable the processor to obtain motion data, a Global Positioning System (GPS) receiver configured to determine location and to enable the processor to obtain at least speed data, and a radio transceiver configured to communicate with the processor. Additionally, the processor is configured to estimate the ignition state of a vehicle using at least the motion data and the speed data.

In a further embodiment, the motion detector is an accelerometer.

In another embodiment, the processor is configured to activate the GPS receiver upon detection of vehicle motion.

In an additional embodiment, the speed data is derived using the Doppler Effect.

In a still further embodiment, the speed data is derived using differences in location over time.

In a still other embodiment, the processor is configured to start a timer when the motion data and the position data are below predetermined thresholds, and the processor is configured to place the GPS receiver in a sleep mode when the motion data and the speed data remain below the predetermined thresholds for the duration of the timer.

In a still additional embodiment, the processor is further configured to match the motion data against specific signatures indicative of a vehicle being towed.

In a yet further embodiment includes a power supply configured to connect to a power line and a voltage detector configured to enable the processor to obtain voltage data. Additionally, the voltage data is indicative of voltage measurements at the power supply.

A yet other embodiment includes a power supply configured to connect to a power line and a noise detector configured to enable the processor to obtain noise data. Additionally, the noise data is indicative of a running engine.

A yet additional embodiment includes a vehicle bus detector configured to enable the processor to obtain bus data, wherein the bus data is indicative of voltage transitions on a vehicle data bus.

A number of embodiments include detecting vehicle motion using a motion detector, detecting vehicle speed using a Global Positioning System (GPS) receiver, estimating the ignition state of a vehicle using a processor using at least the detected vehicle speed and vehicle motion and transmitting the ignition state estimated by the processor to a remote device using a radio transceiver.

In a further embodiment, the detecting vehicle motion further comprises using an accelerometer as a motion detector.

Another embodiment includes detecting vehicle speed in response to detection of vehicle motion.

In an additional embodiment, the speed data is derived using the Doppler effect.

In a still further embodiment, the speed data is derived using differences in location over time.

A still other embodiment includes starting a timer after detection of motion when the detected vehicle motion and vehicle speed are below predetermined thresholds and sleeping the GPS receiver when the vehicle motion and vehicle speed remain below the predetermined thresholds for the duration of the timer.

A still additional embodiment includes detecting towing of the vehicle by matching the detected motion against specific signatures indicative of a vehicle being towed using the processor.

A yet further embodiment includes detecting voltage using a voltage detector. Additionally, the voltage is indicative of voltage measurements at a power supply configured to connect to a power line. Also, the processor utilizes the detected voltage when estimating the ignition state of a vehicle.

A yet other embodiment includes detecting noise using a noise detector. Additionally, the noise is indicative of a running engine. Also, the processor utilizes the detected noise when estimating the ignition state of a vehicle.

A yet additional embodiment includes detecting voltage transitions using a vehicle data bus. Additionally, the voltage transitions are indicative of voltage transitions on a vehicle data bus. Also, the processor utilizes the detected voltage transitions when estimating the ignition state of a vehicle.

Numerous embodiments include a processor configured to estimate the ignition state of a vehicle, a motion detector configured to detect vehicle motion and to enable the processor to obtain motion data. Additionally, the motion detector is an accelerometer.

Numerous embodiments provide a Global Positioning System (GPS) receiver configured to determine location and to enable the processor to obtain at least speed data. Additionally, the speed data is derived using differences in location over time. Also, the processor is configured to activate the GPS receiver upon detection of vehicle motion. Furthermore, the processor is configured to start a timer when the motion data and the position data are below predetermined thresholds. Moreover, the processor is configured to place the GPS receiver in a sleep mode when the motion data and the speed data remain below the predetermined thresholds for the duration of the timer.

Numerous embodiments provide a radio transceiver configured to communicate with the processor.

BRIEF DESCRIPTION OF THE FIGURES

FIG. 2 is a block diagram showing a variety of device configurations in which the device can determine vehicle ignition state without a direct connection to the vehicle ignition line in accordance with an embodiment of the invention.

DETAILED DESCRIPTION OF THE INVENTION

Figure 1:
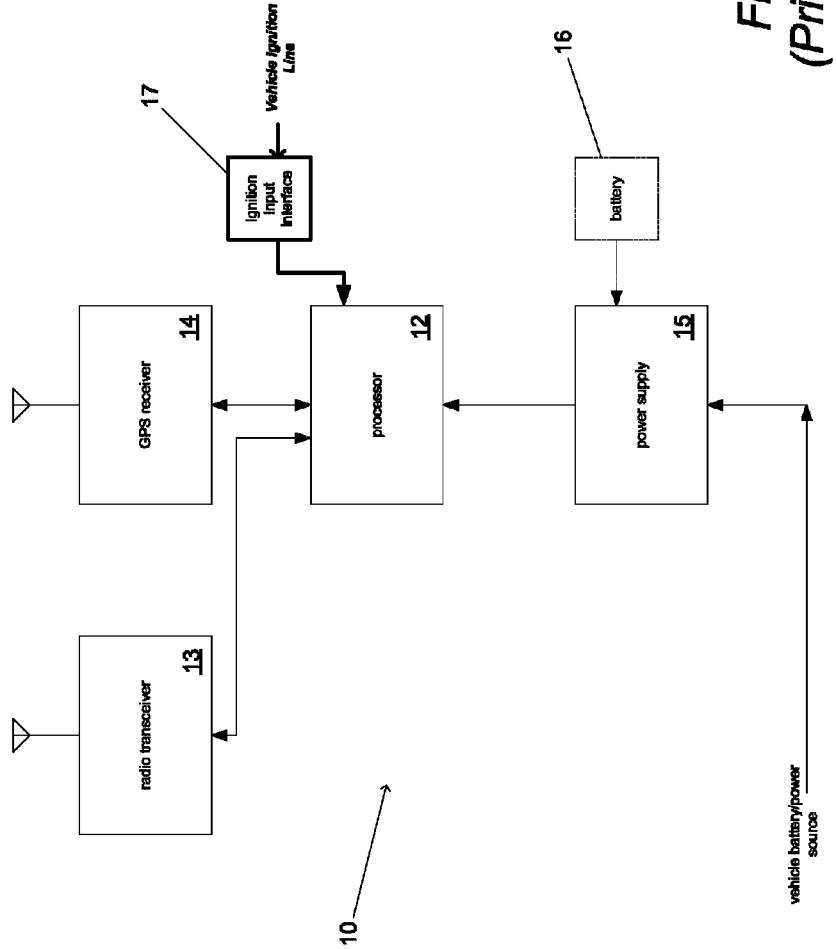
FIG. 1 is a block diagram of a prior art vehicle telematics system.

Turning now to the drawings, systems and methods for determining vehicle ignition state using a device added to the vehicle after the manufacture of the vehicle without a direct connection to the vehicle ignition line are illustrated. In many instances, the device is installed in a location where the vehicle ignition line is available to the device however the device does not utilize a connection to the vehicle ignition line to simplify installation. In a number of embodiments, vehicle ignition state is ascertained by monitoring the vehicle for signs indicative of the vehicle ignition state without directly connecting to the vehicle ignition line. Information indicative of vehicle ignition state can be ascertained by observing characteristics of the vehicle including but not limited to the power supplied by the vehicle, vehicle vibration, communications on an OBD or other data bus line, and/or vehicle position information. In many embodiments, multiple different types of information are combined to ascertain the vehicle ignition state. Although much of the following discussion references vehicle telematics systems, systems and methods in accordance with embodiments of the invention can be implemented in other devices installed after vehicle manufacture that connect to a vehicle power supply.

Devices Configured to Detect Vehicle Ignition State

A device configured to determine vehicle ignition state without a direct connection to the vehicle ignition line is illustrated in FIG. 2. In its simplest configuration, the device 20 includes a processor 22, and a power supply 24 that is connected to the vehicle power source. A battery can be optionally provided 25 to provide an alternative source of power to the power supply. When the device is a vehicle telematics system, the device 20 also includes a radio transceiver 26 and a GPS receiver 28. The processor can obtain position information via the GPS receiver 28 and communicate information, including but not limited to position information, with external devices over a wireless communication link using the radio transceiver 26. In a number of embodiments, the wireless transceiver is configured to communicate via a mobile or cell phone network. The device illustrated in FIG. 2 is not configured to directly connect to a vehicle ignition line. Instead, the device can estimate the vehicle ignition state using one of a variety of techniques in accordance with embodiments of the invention. Although a specific device configuration is shown in FIG. 2, devices in accordance with embodiments of the invention can include any of a variety of configurations including configurations in which the GPS receiver includes a processor that also acts as the processor 22 shown in FIG. 2. Various techniques for determining vehicle ignition state in accordance with embodiments of the invention are discussed below.

Ignition Sensing Using Motion Detection

Devices, such as vehicle telematics systems, in accordance with embodiments of the invention can include a motion detector 30 and a GPS receiver 28. A detector may be combined with a part of a system, such as the processor, or may be a separate device. A detector also includes any devices and/or interfaces that may relate to an area of interest, such as motion. In a number of embodiments, the motion detector 30 possesses the ability to determine acceleration. Examples of motion detectors include but are not limited to MEMS based accelerometers. The motion detector can be used to detect vibration and other motions of the vehicle. After a period in which the motion detector has not detected motion, the sudden detection of motion is typically indicative of the vehicle ignition being activated. Once activated, the absence of motion for a predetermined period of time can be indicative of the vehicle state being OFF. In many instances, the measurements of the motion detector can be supplemented by the output of a GPS receiver. However, the GPS receiver is often put into a sleep mode, such as a power saving mode where the GPS receiver may operate on power ranging from less than full power. For example in operations including a sleep or power saving mode, the GPS antenna may be powered down to a level in which all modules of the GPS receiver are powered down except the module(s) that manage waking of the GPS receiver during periods in which the vehicle is not running (i.e. ignition state is OFF). Therefore, the motion detector alone is relied upon to make an initial determination that the vehicle is in motion when the GPS receiver is in sleep mode.

Figure 3:
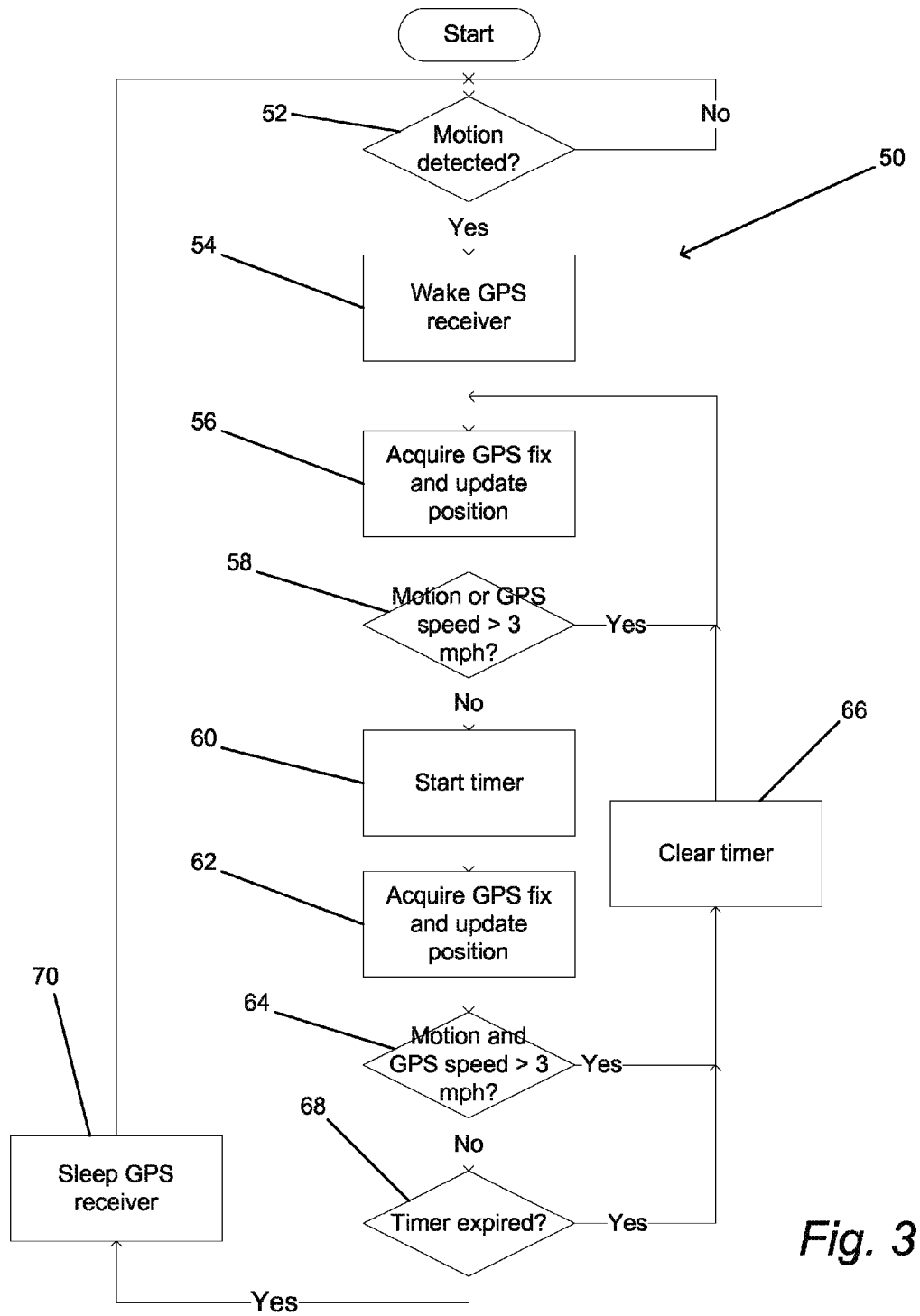
FIG. 3 is a flow chart illustrating a process for determining vehicle ignition state based upon the output of a motion detector and a GPS receiver in accordance with an embodiment of the invention.

A process for estimating vehicle ignition state using a motion detector and a GPS receiver is illustrated in FIG. 3. The process 50 involves detecting (52) motion. When motion is detected, the process assumes that a transition from ignition state OFF to ignition state ON has occurred. The GPS receiver is woken (54) from a sleep or power save mode, and a GPS fix is acquired (56). As long as the motion detector continues to detect motion or the vehicle speed measured by the GPS receiver exceeds a predetermined value (in the illustrated embodiment 3 mph), the process continues detecting (58) motion and determining speed as necessary. Speed data may be a directly determined speed or velocity value (e.g. calculated based upon the Doppler effect observed in the signals received by the GPS receivers), multiple time stamped position measurements that can be used to calculate speed (e.g. differences in location over time), or other data indicating speed. In the event that the motion detector does not detect motion and the vehicle speed is below the predetermined threshold, a timer is started (60). The process continues detecting (62) motion and determining speed and determining (64) whether motion is absent and the vehicle speed is remaining below the predetermined threshold. In the event that motion is detected, the timer is cleared (66). In the event that the state of no motion and speed below a predetermined threshold persists until the timer expires (68), then the process assumes that the ignition state is OFF, places (70) the GPS receiver in sleep mode, and returns to monitoring (52) the motion of the vehicle to detect the ignition state returning to ON.

Although a specific process is illustrated in FIG. 3, in other embodiments the output of the motion detector is analyzed with more precision. For example, the output of the motion detector could be matched against specific signatures indicative of vehicle ignition or indicative of the vehicle being towed. Furthermore, the output of the motion detector can be the sole basis of determining the ignition state of the vehicle, or the output of the motion detector can be considered in combination with additional information that may or may not include a GPS receiver. Accordingly, embodiments of the invention can utilize information generated by a motion detector in any of a variety of ways to estimate vehicle ignition state.

Ignition Sensing Using Input Voltage Measurement

Referring back to FIG. 2, devices in accordance with a number of embodiments of the invention can incorporate an input voltage measurement interface 32 that is connected to the power line connected to the power supply. The input voltage measurement interface includes circuitry that measures voltage levels on the power line and communicates the power level to the device's processor 22.

Figure 2A:
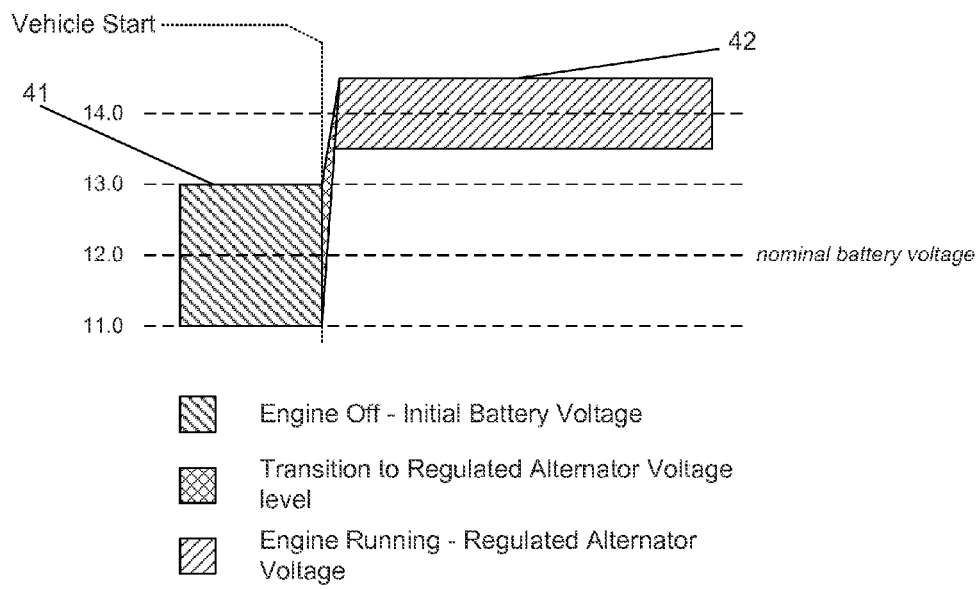
FIGS. 2A and 2B are charts conceptually illustrating vehicle battery voltage when a vehicle's ignition state goes from OFF to ON and from ON to OFF.
Figure 2B:
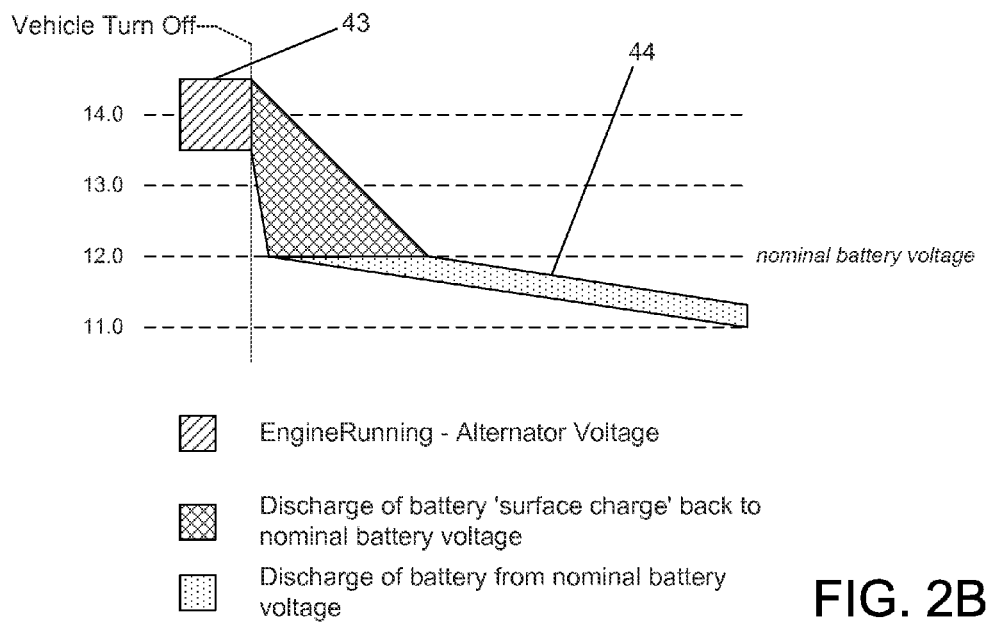

A chart conceptually illustrating vehicle battery voltage when a vehicle's ignition state goes from OFF to ON is illustrated in FIG. 2A. At startup (transitions due to starter motor load are not shown), the voltage will immediately increase from the initial battery voltage 41 to the voltage output by the regulator of the vehicle alternator 42. The battery can initially be at a voltage ranging from heavily discharged to a voltage close to that of the alternator (especially when the vehicle was recently shut off and surface charge has not yet dissipated). A chart conceptually illustrating vehicle battery voltage when a vehicle's ignition state goes from OFF to ON is illustrated in FIG. 2B. When the ignition state goes from ON to OFF, the voltage typically starts to drop from the alternator voltage 43 toward the nominal battery voltage. The rate of the discharge can take anywhere from a few seconds up to several hours, depending on many factors including the condition of the battery and any remaining load on the battery. The input voltage measurement interface or the processor can look for increases or decreases in voltage level indicative of the ignition state transitioning from OFF to ON or ON to OFF. In addition, the processor can combine information collected through the input voltage measurement interface in combination with other information including but not limited to information collected via a motion detector and/or a GPS receiver.

Ignition Sensing Using Noise Detection

Devices in accordance with many embodiments of the invention can incorporate a noise detector interface. A noise detector interface 34 is similar to an input voltage measurement interface with the exception that the noise detector interface looks at whether noise is indicative of a running engine or an operating vehicle or other noise that may give signals indicative of vehicle ignition state, which in some cases may be the high frequency components of the voltage on the power line. U.S. Pat. No. 5,903,063, the disclosure of which is incorporated herein by reference in its entirety, proposes a circuit for use in vehicle electronics systems that provides power to components of the vehicle's electrical system when noise on the vehicle power line, which is indicative of vehicle ignition, exceeds predetermined criteria. The circuit described in U.S. Pat. No. 5,903,603 is intended to reduce the need for automobile manufacturers to install ignition conductors throughout the vehicle. The observation in U.S. Pat. No. 5,903,063 that high frequency noise above a predetermined threshold on the power line is indicative of an ignition state of ON can also be relied upon by devices installed in the vehicle after manufacture. Devices in accordance with embodiments of the invention use the detected noise to record information concerning the vehicle's ignition status. Therefore, the noise detector interface includes circuitry to detect when the high frequency noise exceeds a predetermined threshold and to provide the information to the processor 22. The processor can utilize the information either alone or in combination with information from other sources, such as the output of a motion detector, to determine that the ignition state has transitioned from OFF to ON or vice versa. The determination can be the basis of waking devices such as GPS receivers that consume additional power, and that can provide additional information concerning the state of the vehicle. The determination can also be the basis of logging information concerning the vehicle's journey, such as the time at which the journey commenced, and for interpreting information from a GPS receiver, such as understanding that a stationary vehicle with an ignition state of ON may not have completed its journey. Accordingly, a variety of circuits can be utilized to implement a noise detector interface in accordance with an embodiment of the invention and to provide information to the processor to be used in the estimation of the vehicle ignition state.

Ignition Sensing by Observing the Vehicle Bus

Devices in accordance with embodiments of the invention can include a vehicle bus detector or interface 36 that connects to a vehicle data bus, such as an OBD-II bus, via a vehicle data bus connection 38. If the device does not otherwise need to communicate via the vehicle data bus, then there is very little benefit to implementing all of the functionality required to communicate via the bus. However, a simpler circuit can be used to measure the rate of voltage transitions on the vehicle bus and using the rate as an indicator of the vehicle ignition state. In a simple implementation, the system can provide the rate or an indication of whether the rate exceeds a predetermined threshold to the processor 22. In more advanced implementations, the processor could look for patterns indicative of specific events such as vehicle ignition or the vehicle ignition being turned OFF. In still more implementations, voltage averaging may also be used to observe activity indicative of vehicle ignition. This may include voltage averaging on the OBD or other data bus line monitored to observe activity indicative of vehicle ignition. Accordingly, a variety of techniques can be used in accordance with embodiments of the invention to determine vehicle ignition status using observations of signals, instead of data, received via the vehicle bus either alone or in combination with information concerning the vehicle ignition state derived from other sources.

While the above description contains many specific embodiments of the invention, these should not be construed as limitations on the scope of the invention, but rather as an example of one embodiment thereof. For example, additional sensors such as audio sensors can be used to obtain information indicative of vehicle ignition state. Accordingly, the scope of the invention should be determined not by the embodiments illustrated, but by the appended claims and their equivalents.

What is claimed is:

1. A system configured to estimate the ignition state of a vehicle without a connection to the ignition line of the vehicle, comprising:
   a processor;
   a motion detector, where the motion detector detects vehicle motion and enables the processor to obtain motion data;
   a Global Positioning System (GPS) receiver, where the GPS receiver determines location and enables the processor to obtain at least speed data; and
   a radio transceiver, where the radio transceiver communicates with the processor;
   wherein the processor estimates the ignition state of a vehicle using at least the motion data and the speed data.

2. The system of claim 1 wherein the motion detector is an accelerometer.

3. The system of claim 1 wherein the processor activates the GPS receiver upon detection of vehicle motion.

4. The system of claim 1 wherein the speed data is derived using the Doppler effect.

5. The system of claim 1 wherein the speed data is derived using differences in location over time.

6. The system of claim 1, wherein:
   the processor starts a timer when the motion data and the position data are below predetermined thresholds; and
   the processor places the GPS receiver in a sleep mode when the motion data and the speed data remain below the predetermined thresholds for the duration of the timer.

7. The system of claim 1 wherein,
   the processor matches the motion data against specific signatures indicative of a vehicle being towed.

8. The system of claim 1, further comprising:
   a power supply connected to a power line; and
   a voltage detector that enables the processor to obtain voltage data, wherein the voltage data is indicative of voltage measurements at the power supply.

9. The system of claim 1, further comprising:
   a power supply connected to a power line; and
   a noise detector that enables the processor to obtain noise data, wherein the noise data is indicative of a running engine.

10. The system of claim 1, further comprising:
    a vehicle bus detector that enables the processor to obtain bus data, wherein the bus data is indicative of voltage transitions on a vehicle data bus.

11. A method for estimating the ignition state of a vehicle without connecting to the vehicle's ignition line, the method comprising:
    detecting vehicle motion using a motion detector;
    detecting vehicle speed using a Global Positioning System (GPS) receiver;
    estimating the ignition state of the vehicle using a processor based on at least the detected vehicle speed and vehicle motion; and
    transmitting the ignition state estimated by the processor to a remote device using a radio transceiver.

12. The method of claim 11 wherein the detecting vehicle motion further comprises using an accelerometer as a motion detector.

13. The method of claim 11 further comprising detecting vehicle speed in response to detection of vehicle motion.

14. The method of claim 11 wherein the speed data is derived using the Doppler effect.

15. The method of claim 11 wherein the speed data is derived using differences in location over time.

16. The method of claim 11, further comprising:
    starting a timer after detection of motion when the detected vehicle motion and vehicle speed are below predetermined thresholds; and
    sleeping the GPS receiver when the vehicle motion and vehicle speed remain below the predetermined thresholds for the duration of the timer.

17. The method of claim 11, further comprising:
    detecting towing of the vehicle by matching the detected motion against specific signatures indicative of a vehicle being towed using the processor.

18. The method of claim 11, further comprising:
    detecting voltage using a voltage detector, wherein the voltage is indicative of voltage measurements at a power supply connected to a power line; and
    wherein the processor utilizes the detected voltage when estimating the ignition state of a vehicle.

19. The method of claim 11, further comprising:
    detecting noise using a noise detector, wherein the noise is indicative of a running engine; and
    wherein the processor utilizes the detected noise when estimating the ignition state of a vehicle.

20. The method of claim 11, further comprising:
    detecting voltage transitions using a vehicle data bus, wherein the voltage transitions is indicative of voltage transitions on a vehicle data bus; and
    wherein the processor utilizes the detected voltage transitions when estimating the ignition state of a vehicle.

* * * * *